United States Patent
Neff et al.

[11] Patent Number: 6,129,411
[45] Date of Patent: Oct. 10, 2000

[54] POWERED ROAD VEHICLE COMPRISING A REPLACEABLE REAR BODY MOUNTING

[75] Inventors: Thomas Neff, München; Markus Betz, Dasing; Stefan Teller, München, all of Germany

[73] Assignee: CD Car Development GmbH, München, Germany

[21] Appl. No.: 09/341,168

[22] PCT Filed: Jan. 2, 1998

[86] PCT No.: PCT/EP98/00010

§ 371 Date: Jul. 6, 1999

§ 102(e) Date: Jul. 6, 1999

[87] PCT Pub. No.: WO98/29289

PCT Pub. Date: Jul. 9, 1998

[30] Foreign Application Priority Data

Jan. 4, 1997 [DE] Germany .......................... 197 00 209

[51] Int. Cl.[7] .................................................. B60J 7/00
[52] U.S. Cl. .......................................... 296/196; 296/26.4
[58] Field of Search ....................... 296/26.04, 195–197, 296/35.3, 99.1, 165, 167, 166; 280/511

[56] References Cited

U.S. PATENT DOCUMENTS

| | | | |
|---|---|---|---|
| 2,409,181 | 10/1946 | Bagley et al. | 296/35.3 |
| 2,591,380 | 4/1952 | Schreiner | 296/35.3 |
| 3,419,304 | 12/1968 | Sangimino | 296/99.1 |
| 3,547,480 | 12/1970 | Ward | 296/99.1 |
| 3,796,444 | 3/1974 | Hixon | 280/483 |
| 3,817,545 | 6/1974 | Ward | 296/26 |
| 3,843,158 | 10/1974 | Schwellenbach | 280/403 |
| 4,256,323 | 3/1981 | McBride | 280/423 |
| 4,322,108 | 3/1982 | McPherson | 296/164 |
| 4,452,465 | 6/1984 | Bourke | 296/166 |
| 4,557,518 | 12/1985 | Maclean et al. | 296/165 |
| 4,842,326 | 6/1989 | DiVito | 296/197 |
| 4,848,831 | 7/1989 | Buday | 296/165 |
| 4,887,859 | 12/1989 | Aper | 296/196 |
| 4,995,664 | 2/1991 | Buday | 296/165 |
| 5,108,144 | 4/1992 | Crowley | 296/167 |
| 5,301,997 | 4/1994 | Cudden | 296/197 |

FOREIGN PATENT DOCUMENTS

| | | |
|---|---|---|
| 0 618 106 A1 | 10/1994 | European Pat. Off. . |
| 1250 283 | 5/1960 | Germany . |
| 267649 | 3/1927 | United Kingdom ................. 296/99.1 |
| 365929 | 1/1932 | United Kingdom ................. 296/35.3 |
| WO 90/08052 | 7/1990 | WIPO . |
| WO 90/09917 | 9/1990 | WIPO . |

OTHER PUBLICATIONS

International Search Report.

*Primary Examiner*—Joseph D. Pape
*Assistant Examiner*—Kiran Patel
*Attorney, Agent, or Firm*—Smith Gambrell & Russell, LLP

[57] ABSTRACT

A powered road vehicle, namely a passenger car having a permissible maximum laden weight of 3.5 tons or a lorry having a permissible maximum laden weight of 5 tons, comprises: a base vehicle having a load-transferring bottom structure which includes a vehicle body bottom and/or a carriage. The bottom structure is provided with a front axle and at least one rear axle. The base vehicle also includes a vehicle body supported on the bottom structure, the rear part of the vehicle body having side walls. A replaceable rear body mounting upwardly joins the side walls and is supported directly on the bottom structure in a load-transferring manner. The rear body mounting is releasably locked in a main coupler of the base vehicle, and the main coupler is supported directly on the bottom structure in a load-transferring manner. The rear body mounting is also fixed to a separate aligning coupler arranged at a distance from the main coupler. The rear body mounting is adapted to engage the aligning coupler in a pre-alignment position, and to be lowered from the pre-alignment position into a locking position at the main coupler. The main coupler is arranged both to provide main coupling of the rear body mounting to prevent displacement and rotation thereof, and to support a semi-trailer so that vertical loads and trailing forces are transferred.

26 Claims, 13 Drawing Sheets

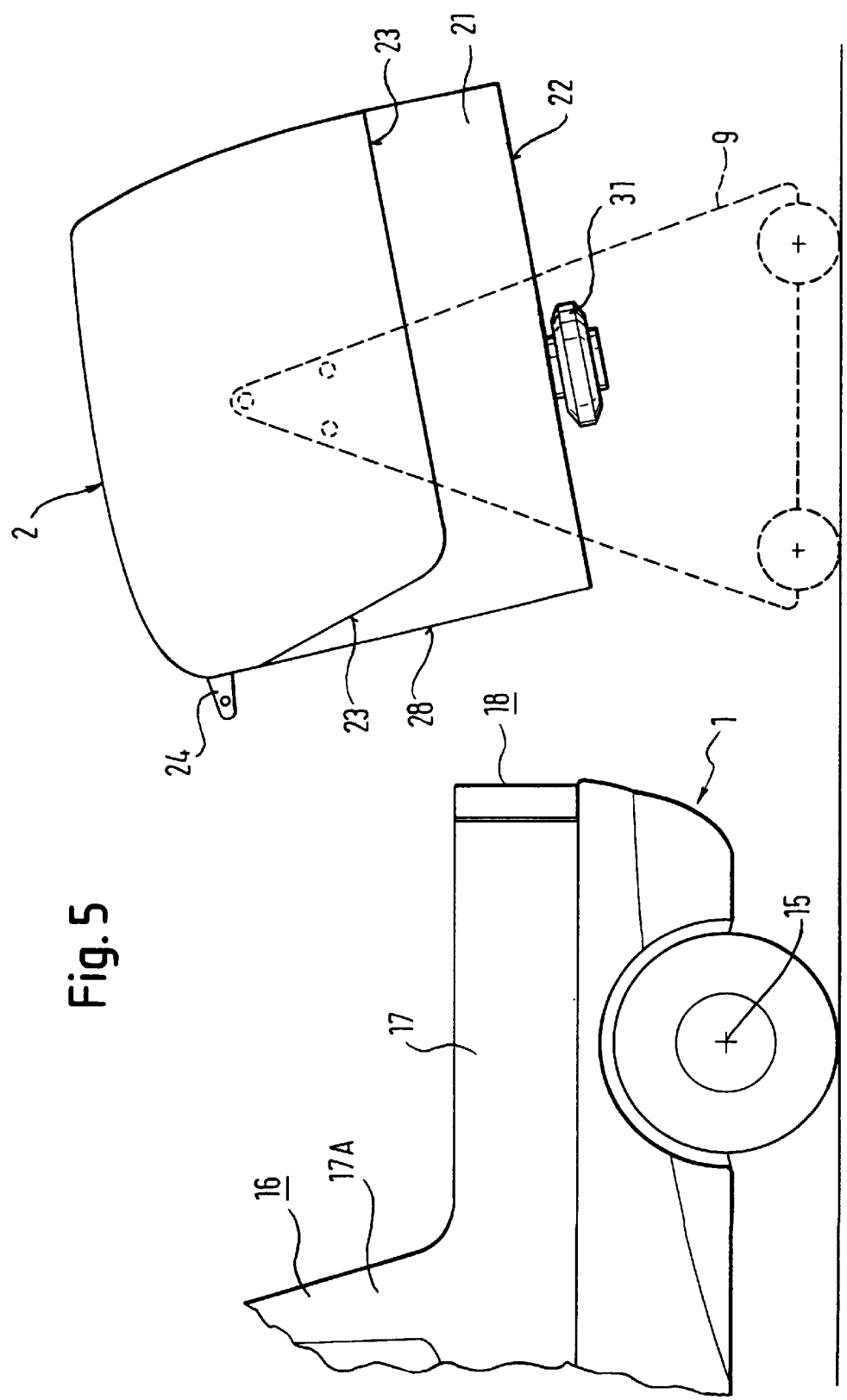

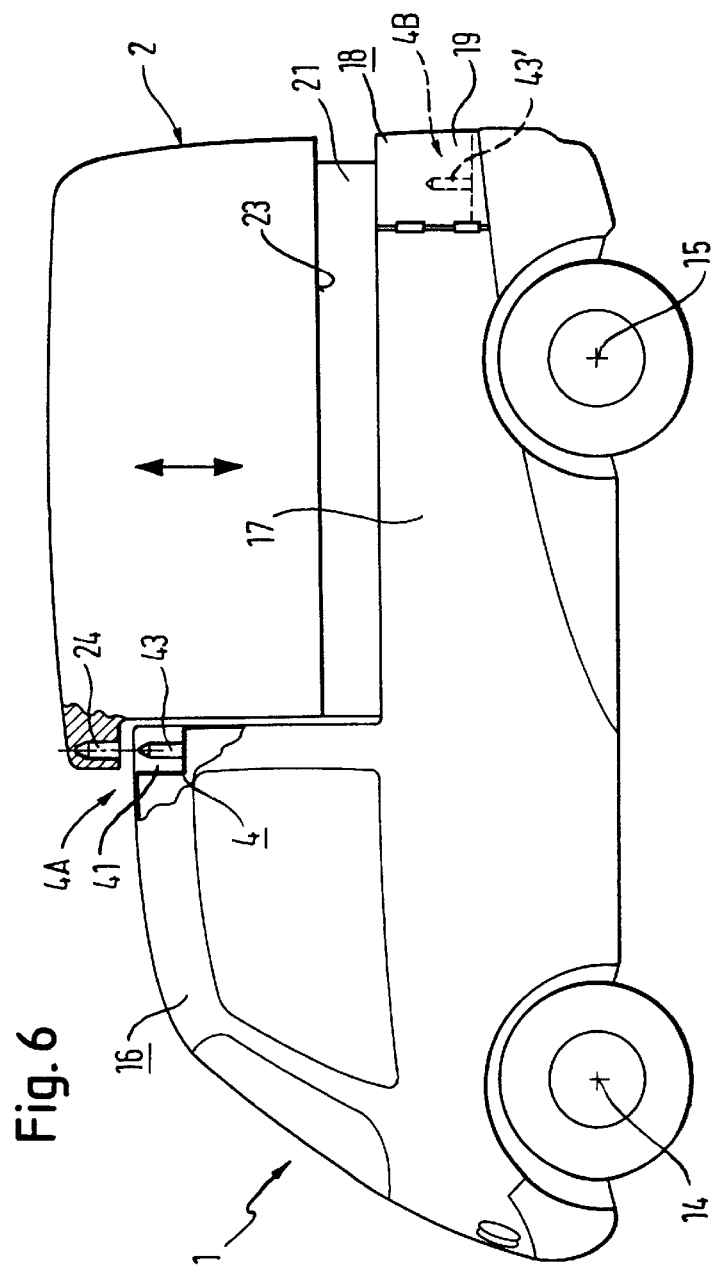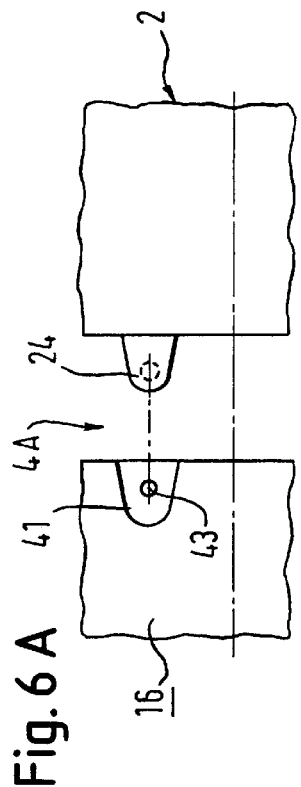

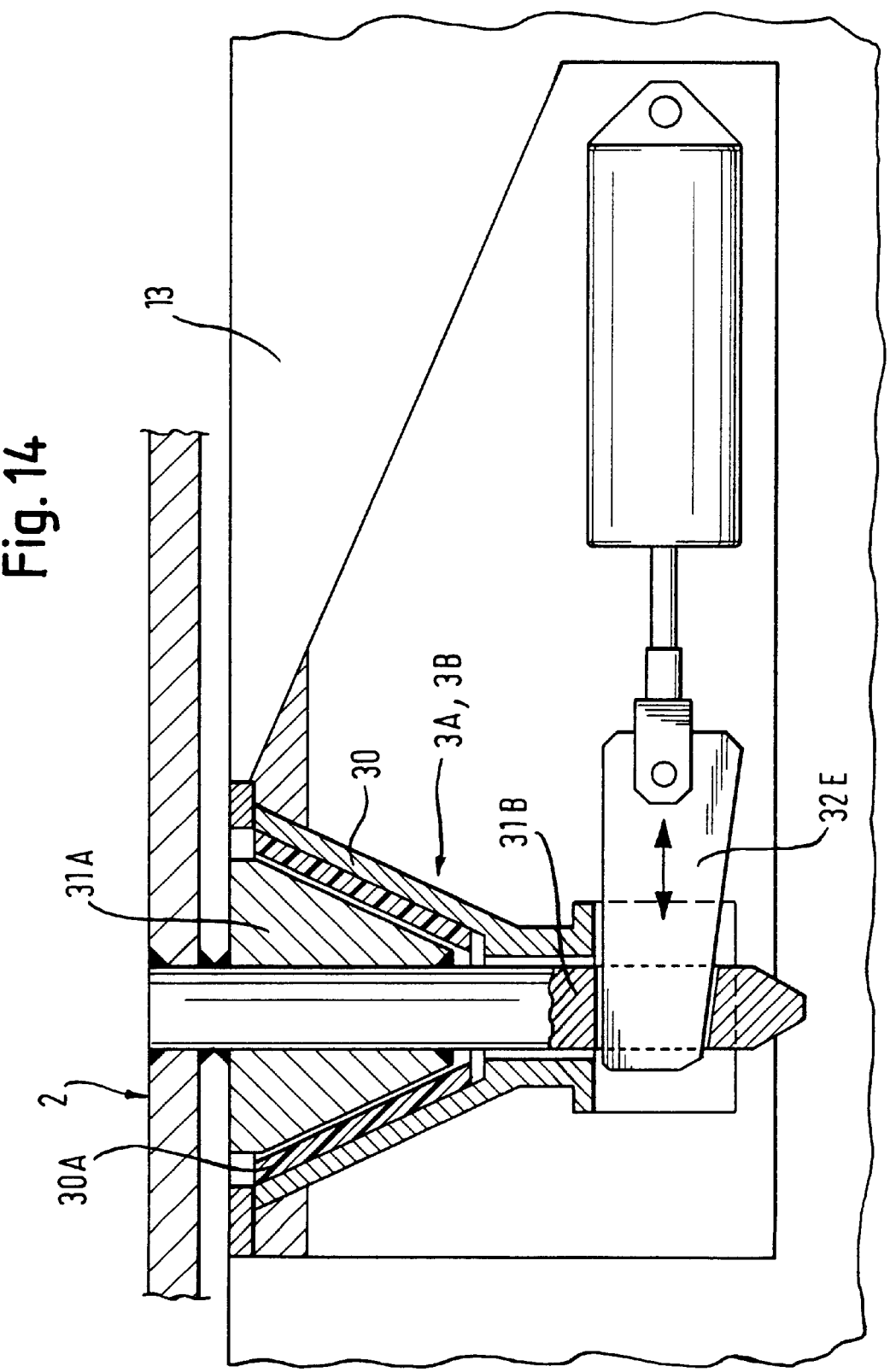

POWERED ROAD VEHICLE COMPRISING A REPLACEABLE REAR BODY MOUNTING

The invention relates to a powered road vehicle comprising a replaceable, and thus variable, rear body mounting.

Road vehicles normally have a permanent body structure associated with the vehicle to allow the transport of commodities and/or people, for example. These vehicles are provided with non-variable bodies.

A further category of vehicles provides so-called swap bodies, i.e. the rear bodies of such vehicles can be replaced by other bodies within a relatively short time, these bodies being designed in different ways for various applications. Such interchangeable bodies exist in increasing numbers in the field of big commercial vehicles, because they allow a parked body to be loaded or unloaded independently of the presence of the powered carriage.

Vehicles comprising variable rear bodies have been known primarily from the field of trucks and commercial vehicles, mainly in relation to swap bodies, i.e. bodies that can be placed easily onto an existing carriage (including the drive engine and the driver's cab) and can also be removed easily therefrom. The purpose of such a system is to enable a powered unit (carriage including the drive engine and driver's cab) to utilise a plurality of variable bodies. In this manner, a parked variable body may be loaded and unloaded while the powered unit is transporting other variable bodies. This organisation saves time as the powered unit is in use during the loading and unloading of the body, and it saves capital as it is not necessary to purchase a separate powered unit for each variable body. Moreover, the prior art vehicle body mountings exclusively constitute mountings that do not communicate with the inner space of the vehicle.

The use of variable rear bodies in the form of swap bodies is very easy in the context of said types of trucks and commercial vehicles since these vehicles have an extremely stable carriage (including the engine and driver's cab) on which the variable bodies can be mounted easily. There is no interference with a body structure such as that of a car or light commercial vehicle.

Conversely, the use of variable bodies for smaller vehicles has been realised only in the form of studies and single pieces. While the concept as such is obvious and logical, its implementation causes considerable problems with respect both to technical design and financial aspects.

An object of the invention is to provide a technical solution enabling the use of variable rear bodies for smaller powered road vehicles, preferably the size of cars and smaller commercial vehicles.

Another object of the invention is that the variable rear bodies should not only be transportable in the form of swap bodies, but they should be able to form part of the vehicle body when mounted thereon, such that the inner space of a variable rear body mounting may form a space integral with the driver's and/or passengers' space of the base vehicle.

The prior art has already provided basic technical solutions also in this field allowing the conversion of a normal car into a cabriolet or coupé, for example. In the prior art, however, the variable bodies are generally mounted on the body structure of the base vehicle, preferably on the side and roof portions thereof, which have to be reinforced accordingly or supplemented by support structures.

The intrinsic serious drawback of such designs is that they require completely different body designs—as compared to conventional vehicle bodies—for transferring and receiving the forces of added conversion bodies. The relatively soft car body structure can either carry only light body mountings, or when designed to accommodate heavier body mountings, it requires solid reinforcements which are costly and heavy.

One of several prior art examples is represented by the Nissan Exa sports car of 1986, in which the rear body mounting behind the targa roll bar can be replaced such as to produce a coupé variation, a cabriolet variation and a sports combination. However, these interchangeable rear bodies represent only extremely light, small mountings of minor utility and variability with respect to the vehicle as a whole.

The most sophisticated and advanced solution—in terms of both construction and system—for light road vehicles having variable car bodies has been presented by Mercedes-Benz at the Geneva Car Fair 1995 in the form of a concept car called Vario Research Car (VRC). This concept allows the car to be converted by replacing the upper rear body structure at both sides toward the front, up to the B-column, while the roof is replaced completely up to the frame of the front windshield. This variability has a substantial impact on the entire vehicle concept, and allows the base vehicle to be converted from an estate car into a 2-door saloon car, a pick-up, and a cabriolet, respectively. The variable car bodies can be formed relatively light by applying sophisticated technology and expensive lightweight construction. On the other hand, the variations also show that this concept relates exclusively to a passenger car while heavier vehicle bodies cannot be employed, one reason being that a considerable part of the forces from the variable bodies is transferred to the frame of the front windshield.

Regarding heavier rear body mountings, indispensable for industrial applications, a disadvantage resides in that the load is received in the area of the rear axle in a plane above the wheel casings through a reinforced lateral structure of the vehicle body. This constructional solution again allows only light variable body mountings to be used, as the forces from the body mountings have to be transferred to the bottom structure through lengthy paths.

Summarising the drawbacks of the prior art constructions of powered road vehicles having variable rear body mountings in the field of light road vehicles (aimed at by the solution according to the invention), the static and dynamic forces arising from the mass of the variable vehicle body mounting are received at a place relatively high above the centre of gravity of the base vehicle, said forces are transferred to the vehicle body structure which may be reinforced, and/or the variable rear body mountings can only be relatively light. Variability is therefore considerably restricted, in particular with respect to variations for industrial applications which frequently have to be relatively heavy and voluminous to allow bigger loads or bulky commodities to be transported in order for the vehicle to be profitable.

According to the invention, these drawbacks are obviated by the basic concept that the forces arising from the variable rear body (mass, dynamic forces resulting from movements of the vehicle and the like) are largely received at the lowermost point of the carriage (depending on the vehicle type and construction), i.e. at the load-transferring bottom structure from which the wheels are suspended, while only the considerably smaller forces resulting from other operations, such as inserting and removing, centering, sealing and securing of the variable rear body with respect to the base vehicle, are transferred entirely or partly to the vehicle body structure of the base vehicle.

The road vehicle contemplated by the invention preferably comprises a typical passenger car such as a saloon car, a coupé, a cabriolet, an estate car, a van or minivan, an off-road or cross-country vehicle, or a minibus. The invention covers cars of this type up to a permissible maximum laden weight of 3.5 tons, in particular if they do not have a separate carriage but a self-supporting car body bottom. Moreover, small trucks, in particular closed box-shaped vehicles, having a maximum laden weight of 5 tons may be designed in accordance with the invention. The same applies to road vehicles according to the invention in which the load-transferring bottom structure, from which the wheels are suspended, is represented by a separate carriage, having two longitudinal beams, for example, or a carriage in combination with a vehicle body bottom structure participating in the transfer of the load.

Each road vehicle according to the invention comprises an autonomous base vehicle including a powered drive unit and a load-transferring bottom structure which consists of a vehicle body bottom and/or carriage and is equipped with a front axle and a single rear axle or twin rear axles.

Following usual terminology in the field of vehicle engineering, the terms "front axle" and "rear axle" are not meant to define any continuous axle components but the front and rear wheels, the associated suspension and spring systems, and the imaginary geometric axes about which the respective wheels rotate during straight travel of the vehicle.

The body bottom structure, from which the wheels are suspended through associated wheel suspensions, is constituted by the bottom structure of a self-supporting vehicle body and/or carriage, depending on the type of vehicle, and supports a vehicle body mounting that forms an individual cab or double cab comprising a space for the driver and, as the case may be, a space behind the driver's seat. This space may be open toward the rear, or closed by a wall which may be detachable. The rear body mounting, preferably the part thereof immediately adjacent to the B-column, further comprises side walls protruding vertically from the bottom structure and surrounding the rear part of the base vehicle on both longitudinal sides and on the rear side, as seen in the normal travelling direction of the vehicle. The side walls may join the front body through transitional body portions. The rear part of the base vehicle, above the bottom structure, is largely open towards the top.

In a basic version of the road vehicle according to the invention, a replaceable rear body mounting is arranged above the side walls and upwardly covers the aforementioned open rear part of the base vehicle, the longitudinal sides and the rear side such that the part of the rear body mounting disposed above the side walls joins the body of the base vehicle.

According to the invention, the rear body mounting—as well as any other rear body mounting substitutable for the rear body mounting of the basic version—is supported directly, in a load-transferring manner, on the bottom structure and is (a) releasably locked to the base vehicle through a main coupler which is directly supported on the bottom structure in a load-transferring manner, and (b) positively held by a separate aligning coupler arranged at a distance from the main coupler.

The main coupler according to the invention is designed as a main lock to secure the position of the rear body mounting with respect to the base vehicle and to prevent rotation of the rear body mounting. Therefore, the rear body mounting in use is positively locked through the main coupler (cooperating with a mating coupler formed or fixed at the rear body mounting) to accommodate all the dynamic main forces acting on the rear body mounting during driving, independently of any load being present or absent on the rear body, and the main coupler transfers these dynamic main forces directly to the load-transferring bottom structure of the body, from which the wheels of the vehicle are suspended. The load forces resulting from the own weight and additional load weights of the respective rear body mounting are primarily introduced directly into the load-transferring bottom structure. To transfer these load forces, the rear body mounting may be supported on the main coupler in a load-transferring manner. Additionally or alternatively, the rear body mounting may be seated on the bottom structure, directly or through interposed support means, such as frames, support blocks, or rollers and the like. Preferably, such support means have limited resiliency so that they are squashed toward the bottom structure when the rear body mounting is locked to the main coupler. The overall design of the main coupler and the support means (if provided) is such that the body of the base vehicle is at most charged with secondary forces transferred by the respective rear body mounting.

Further according to the invention, the rear body mounting is positively fixed and locked to the base vehicle through an aligning coupler arranged at a distance from the main coupler. The aligning coupler cooperates with a mating alignment assembly arranged on the rear body mounting, the aligning coupler and mating alignment assembly being designed such that when the rear body mounting is to be fitted the alignment assembly of the rear body mounting can be positively inserted into the aligning coupler of the base vehicle and positively pre-locked in a pre-alignment position and then positively guided and lowered, in a linear or pivoting movement, from the pre-alignment position to a final position until the mating coupler of the rear body mounting is received and locked in the main coupler of the base vehicle. Accordingly, the main coupler is designed to enable the mating coupler of the rear body mounting to be linked to the main coupler when the rear body mounting is lowered or pivoted downward.

Therefore, owing to the aligning coupler, the rear body mounting can be placed on the base vehicle and pre-aligned so as to be placed onto the main coupler of the base vehicle in a unitary displacing movement allowing the rear body mounting to be locked through the main coupler and to be positively held additionally on the base vehicle by the aligning coupler at a distance from the main coupler. However, since at least the major part of the forces acting on the rear body mounting (consisting of the own weight of the rear body mounting, the load received by the rear body mounting unless transferred directly to the bottom structure through support means of the rear body mounting, and in particular the dynamic forces as exerted on the rear body mounting during the drive states of the powered vehicle) is transferred to the bottom structure through the main coupler, only secondary forces need to be transferred to the base vehicle through the aligning coupler. This allows the aligning elements to be implemented in the form of relatively light components with respect to their weight and rigidity.

Moreover, the main coupler and aligning coupler may be designed such that the rear body mounting can be removed in the inverse order of the installation steps. Hence, when the rear body mounting is to be removed, the main coupler is unlocked, the rear body mounting is lifted or pivoted from the main coupler, elevated to the pre-alignment position in the alignment assembly, and then pulled out therefrom.

According to an embodiment of the invention, the main coupler may be even formed and designed such that it is further adapted to transfer loads and tractive forces when supporting a semi-trailer, allowing the base vehicle of the invention to be selectively used as a traction vehicle of a semi-trailer, thus considerably increasing the versatility of the base vehicle. In this arrangement, the main coupler according to the invention is designed and fixed to the bottom structure such that the vertical loads of the trailer in all driving states and the tractive forces required to pull and push the trailer in all driving states can be transferred to the bottom structure and, thus, to the base vehicle. Depending on the design of the main coupler, vertical trailer loads in the range of 1,000 to 15,000 N and horizontal pulling/pushing forces of 5,000 to 50,000 N as required for trailing operations of the base vehicle can be transferred to the bottom structure.

The coupler joint required for the trailer coupler may be embodied in the form of an intermediate adapter that can be locked to the main coupler of the invention to fix the position of the intermediate adapter and to prevent it from rotating, as in the case of a rear body mounting; to this end, the side of the intermediate adapter facing the main coupler mates the main coupler.

All the rear body mountings according to the invention are designed to be locked to the base vehicle in the same manner cooperating with the main coupler on the one hand and the aligning coupler on the other hand. The types of interchangeable rear body mountings in particular comprise box-like mountings closed on all sides; estate mountings glazed on the lateral (longitudinal) and rear sides, open or closed at the front end, lacking or including seats, preferably including a rear door, and possibly including a separate luggage boot; roller roof mountings including integrated seats; open trough mountings; caravan mountings; cassette mountings combining a plurality of modules into a structural unit; and the like.

Interchangeable rear body mountings according to the invention may be provided with a lower part arranged to be fitted between the side walls and comprising a preferably completely closed bottom, on which the mating coupler (cooperating with the main coupler) and the load-transferring support means (if any) are arranged to support the rear body mounting on the bottom structure of the base vehicle. To this end, the bottom of the rear body mounting is formed and/or reinforced such as to be self-supporting.

Further, the interchangeable rear body mountings, or at least a sub-set thereof, are provided with shoulders seated on the longitudinal side walls and possibly on the rear wall. If the rear body mounting is designed to lengthen the interior space of the vehicle, said shoulders may be formed as sealing shoulders. The sealing shoulders only serve to transfer secondary forces, as far as required to achieve the desired sealing function even when the body of the base vehicle and the rear body mounting itself rock during travelling. This relief of the body structure of the base vehicle can be achieved by the feature that at least the rear body support means arranged on the body of the base vehicle to transfer vertical downward forces, including means for supporting aligning couplers on the vehicle body, are arranged to yield, preferably in a resilient or elastic manner, so that the major part of the vertical main forces is transferred directly to the bottom structure.

The upstanding rear wall of the base vehicle may be realised as a fixed wall. Preferably, however, the rear wall is arranged as a pivotable rear flap or door. This rear door may be comprised of a single door leaf pivotable up and down by means of a lower hinge. In a preferred embodiment, the rear door comprises two door leaves that may be pulled around the corners formed by the longitudinal and rear side walls, and pivoted about hinges arranged in the longitudinal side walls at a distance from the rear ends thereof. This arrangement allows the whole width between the longitudinal side walls to be utilised in dimensioning the width of the rear body mountings.

The aligning coupler may be provided in the form of one central structural unit arranged in the longitudinal axis of the vehicle, or in the form of two or more aligning coupler units arranged, at a distance from each other, on the body of the base vehicle and/or on the bottom structure thereof. The entry portion of the aligning coupler may be provided with a conically converging alignment mouth piece, into which a complementary projection of the rear body mounting may be inserted in a pivoted or linearly lifted position, such as to direct the rear body mounting until the pre-alignment position is obtained where the rear body mounting enters the aligning coupler. Conversely, the alignment mouth piece may be arranged on the rear body mounting, and the projection may be arranged at the aligning coupler.

Further, the aligning coupler is equipped with a guiding mechanism to guide the rear body mounting from its pre-alignment position into the final position, in which the rear body mounting is engaged in the main coupler, by pivoting or linear lowering of the rear body mounting. The guided downward pivoting is particularly facilitated by a horizontal pivoting bolt, to which the rear body mounting is releasably pre-locked in the pre-alignment position to pivot the rear body mounting downwardly. Guided linear lowering may be accomplished by a vertical aligning means, such as a guide rail or bolt, or any other guiding mechanism, to which the rear body mounting can be pre-locked in its pre-alignment position to be lowered in a guided fashion.

A separate lift mechanism or other type of auxiliary apparatus may be provided to introduce a desired rear body mounting into the aligning coupler. In order to install the rear body mounting on the base vehicle, the lift mechanism or other auxiliary apparatus is arranged to lift the rear body mounting, which is parked outside the base vehicle, and to move the rear body mounting into the aligning coupler. Such an auxiliary apparatus may be independent of the base vehicle or may be incorporated therein. On the other hand, it is also possible to lift the rear of the vehicle to install the rear body mounting thereon.

The main coupler may be arranged in the form of a plurality of main coupler sub-units disposed at a distance from each other such that the resulting main coupler force is transferred to the bottom structure along the longitudinal axis of the base vehicle in the area of the rear axle. Such an embodiment is provided particularly when the bottom structure of the base vehicle comprises a carriage including two longitudinal beams extending along opposite sides of the longitudinal axis of the base vehicle to directly support the main coupler sub-units. In such cases, the bottom of the respective replaceable rear body mounting accordingly comprises a plurality of mating couplers in an arrangement complementary to the main coupler sub-units.

In this case, the coupler joint for coupling a semi-trailer may comprise an intermediate frame supported on the main coupler sub-units such as to transfer both vertical loads and horizontal pulling or trailing forces.

According to the invention it is also possible to arrange the main coupler in the form of several main coupler sub-units, a plurality of which are disposed symmetrically with respect to the longitudinal axis of the base vehicle at a distance from each other, while a central main coupler unit is located in the longitudinal axis of the base vehicle in the area of the rear axle thereof. Owing to this arrangement, the forces to be transferred to the bottom structure can be distributed over the bottom structure. In this embodiment, the central main coupler unit may be dedicated to the support of a semi-trailer such as to transfer both vertical loads and horizontal pulling forces.

For the majority of applications, the entire main coupler is arranged in the form of a main coupler unit disposed in the longitudinal axis of the base vehicle in the area of the rear axle. The main coupler may be displaced from the rear axle by 300 mm toward the front or rear end. Preferably, the amount of displacement is selected such as to favour a stable driving state of the combined base vehicle and semi-trailer unit.

For the rest, the main coupler according to the invention may comprise a positive locking device, in particular including clamping members that can be set manually and/or through an actuator to positively engage or clamp the mating coupler fixed to the bottom of the respective rear body mounting. Preferably, the main coupler is designed such that the mating coupler and the rear body mounting are tightened vertically to the bottom structure when the mating coupler is being locked, and has been locked, in the main coupler. To meet this purpose, the mating coupler may comprise a ball pin or mushroom pin or any other wedge faces adapted to be engaged by the clamping members of the main coupler in order to vertically tighten the mating coupler and, thus, the rear body mounting.

Further, the main coupler preferably comprises a centering guide to centre and guide the mating coupler of the rear body mounting caught in the main coupler while the rear body mounting is being lowered. The centering guide compensates for any deviation of the rear body mounting from its desired pre-alignment position. In order to avoid the rear body mounting being distorted laterally and/or longitudinally in the aligning coupler when the rear body mounting is inserted in the main coupler, the aligning coupler may be arranged to yield in a limited resilient fashion to compensate for any such distortions. Such limited resilience and/or support of the aligning coupler is provided in particular in the event that the aligning coupler is supported on the body of the base vehicle so that such distortions of the rear body mounting are kept away from the body of the base vehicle.

The clamping members of the main coupler may be constituted by clamping jaws that are displaceable linearly and/or pivotable. However, it is also possible for the main coupler to be provided with a clamping member in the form of a rotatable screw socket, or threaded tube, adapted to be engaged by a screw bolt embodying the mating coupler of the rear body mounting. In this arrangement, the screw socket may be provided with a worm gear adapted to be engaged by a worm drive.

The adjustable clamping members of the main coupler may be controlled by a drive actuator, which may be embodied by a pneumatic, hydraulic or electric actuator. Alternatively, or preferably additionally, the clamping members may be designed to be actuable manually.

In the following, the invention will be explained with reference to embodiments illustrated at least schematically in the drawing figures.

FIGS. 5 to 8 show further exemplary road vehicles according to the invention.

FIGS. 9 to 14 schematically show selected designs of base vehicle main couplers for the replaceable rear body mountings in accordance with the invention.

Figure 1:
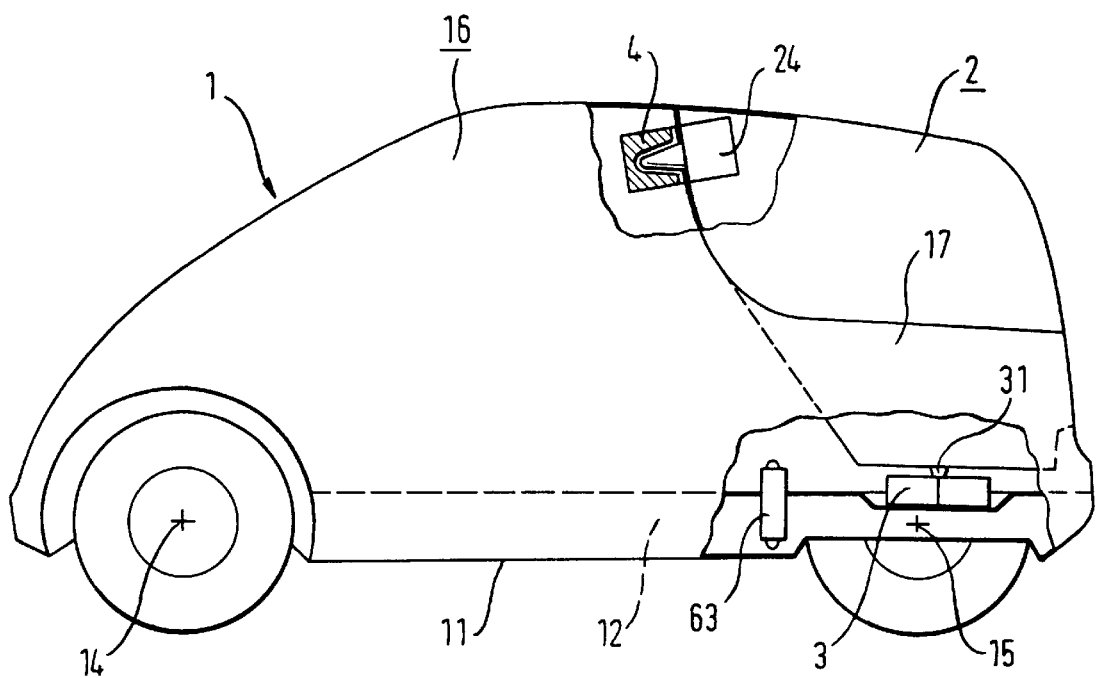
FIGS. 1 to 4 show embodiments of a powered road vehicle according to the invention, including some detailed views illustrating how the replaceable rear body mounting is supported and locked on the base vehicle.

An exemplary embodiment of a powered road vehicle according to the invention is illustrated in FIG. 1.

The base vehicle 1 comprises a load-transferring bottom structure 11 in the form of a self-supporting vehicle body bottom 12. A front axle 14 and a rear axle 15 are suspended from the bottom structure 11, and a vehicle body 16 is supported on the bottom structure 11. The rear end of vehicle body 16 is provided with side walls 17. The variable rear body mounting 2 associated with base vehicle 1 is mounted in an easily releasable manner on base vehicle 1. When the variable rear body mounting 2 is to be fitted on base vehicle 1, the rear body mounting 2 is first aligned with respect to base vehicle 1 through one or several aligning couplers 4, then guided and centered, and finally fixed once the rear body mounting 2 has passed to its predetermined final position. The aligning couplers 4 are arranged between base vehicle 1 and variable rear body mounting 2, while mating alignment elements 41 corresponding to the aligning coupler units 4 are firmly attached to the rear body mounting 2.

When the centering process has been completed and the rear body mounting has been fixed in its final position, the variable rear body mounting 2 is lowered toward base vehicle 1 until the rear body mounting 2 can be fastened to bottom structure 11 of base vehicle 1 by means of a releasable main coupler 3. A mating coupler 31 firmly secured to the variable rear body mounting 2 is locked in the releasable main coupler 3.

The locking connection established by means of main coupler 3 provides a robust link between base vehicle 1 and variable rear body mounting 2 directly through the bottom structure 11 of base vehicle 1.

The main advantages of this solution according to the invention reside in that it is applicable to light categories of powered road vehicles to be equipped with rear body mountings, such as cars and light commercial vehicles. It is particularly advantageous that the static and dynamic forces from the variable rear body mounting 2 are transferred directly to the bottom structure 11 of base vehicle 1; thus, the body 16 of base vehicle 1 is loaded only by relatively small forces from the aligning coupler units 4, and since the substantially bigger static and dynamic forces from the variable rear body mounting 2 are transferred to the lower bottom structure 11 of base vehicle 1, it is considerably easier to influence the driving characteristics by design measures.

Preferably, the solution according to the invention provides for a central releasable main coupler 3 in direct vicinity above the rear axle 15 of base vehicle 1, and for an aligning coupler unit 4 in the centre of the roof area of base vehicle 1 at the gap towards the variable rear body mounting 2. However, depending on the particular application, it may be desirable to provide a plurality of aligning coupler units 4. In some cases, for example, a superior design may be achieved by the provision of two aligning coupler units 4, about which the variable rear body mounting 2 may be pivoted downwardly once it has been aligned therein. If heavier variable rear body mountings 2 are employed, it may be necessary to use an auxiliary apparatus 9, such as a portal frame or manipulator, to lift and convey the variable rear body mounting 2 (when the latter is separate from base vehicle 1) and to align it in the longitudinal, transverse and vertical directions for assembly on, or disassembly from, the base vehicle 1, which considerably facilitates working with a single aligning coupler unit 4.

Figure 2:
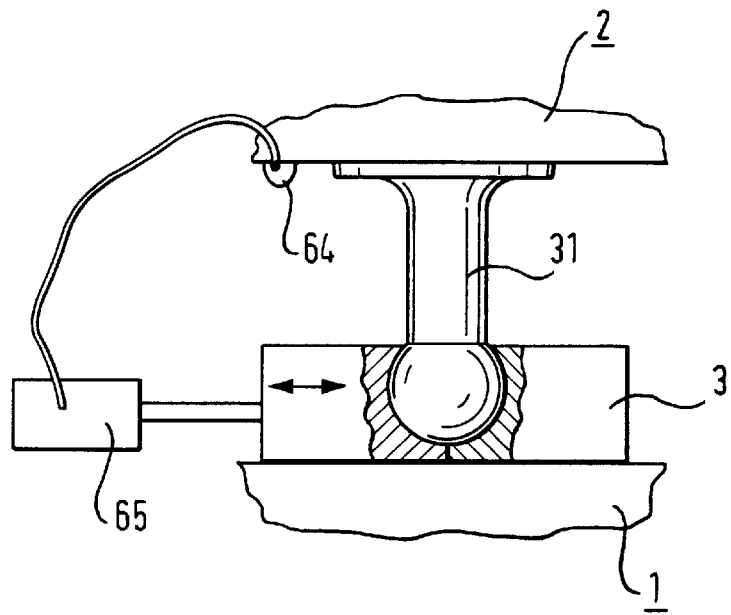
Figure 3:
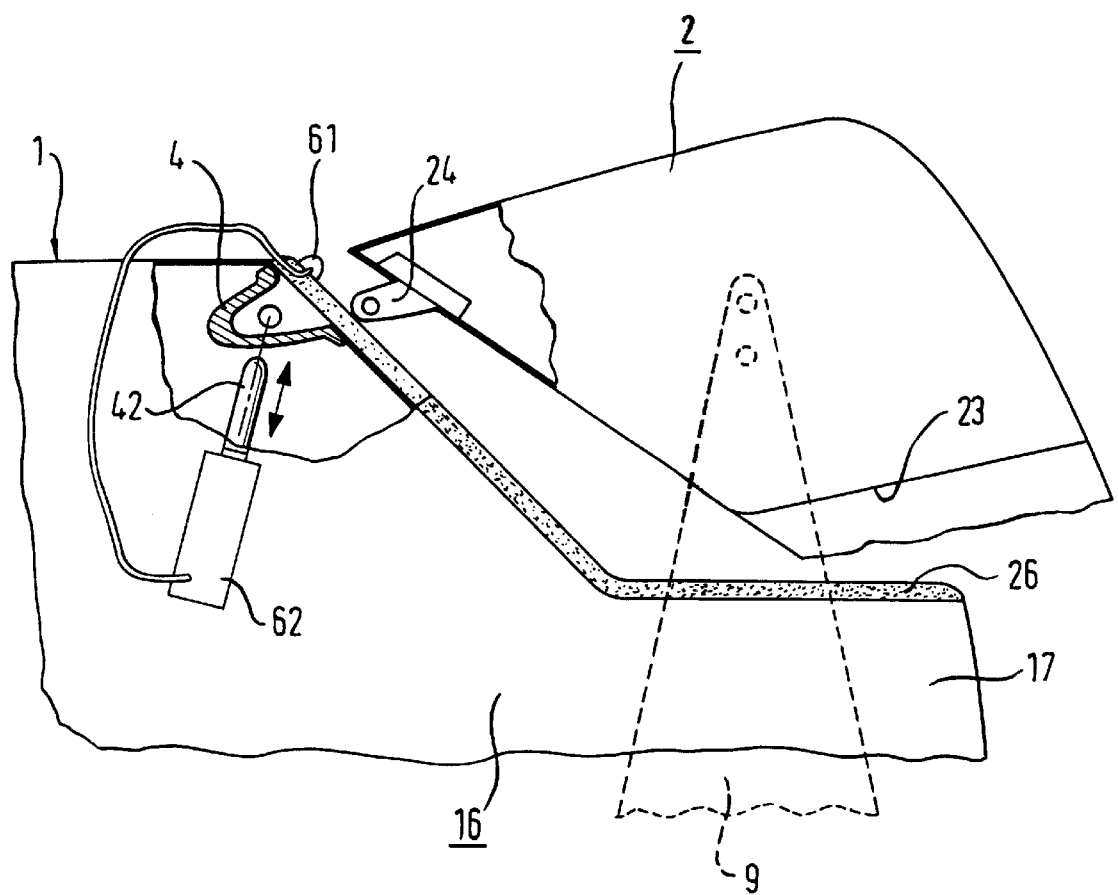

FIG. 2 represents a preferred embodiment of the releasable main coupler 3, and FIG. 3 illustrates a preferred embodiment of the aligning coupler unit 4.

When the variable rear body mounting 2 is to be placed on the vehicle body 16, the rear body mounting 2 is first aligned with the aligning coupler 4 fixed to the base vehicle 1, the aligning operation being performed with the help of the mating member 24 firmly secured to the variable rear body mounting 2. If the variable rear body mounting 2 is light, it can be placed manually; heavier rear body mountings 2 may be placed with the help of an auxiliary apparatus 9, such as a portal crane or movable frame.

When the front end of mating member 24 has been inserted in the aligning coupler 4, the variable rear body mounting 2 is moved towards aligning coupler 4 until the mating member 24 has reached its final position within aligning coupler 4. In a preferred embodiment, the final position is determined by a sensor 61, e.g. a contactless proximity switch, that causes the aligning coupler 4 to be locked by an actuator 62, e.g. a pneumatic cylinder, when the variable rear body mounting 2 reaches its final position within aligning coupler unit 4.

The locked condition, which at the same time secures the variable rear body mounting 2 to the base vehicle 1, may be ensured, in one exemplary embodiment, by a locking device 42, e.g. a bolt, attached to the actuator 62, said bolt being pushed by actuator 62 perpendicularly to the driving direction and horizontally into coaxial bores arranged in mating member 24 and aligning coupler 4, respectively, in response to a signal from sensor 61.

Unlocking and removal of the variable rear body mounting 2 from the aligning coupler 4 is carried out in the inverse order of steps in response to an external signal, generated through an unlocking button, for example. When the variable rear body mounting 2 is held in the aligning coupler 4 (by the locking device 42 extending through aligning coupler 4 and mating member 24), the variable rear body mounting 2 is lowered relative to base vehicle 1. This may be performed either by lowering the variable rear body mounting 2, or by lifting the base vehicle 1. If the rear body mounting 2 is light, it may be lowered directly manually, while heavy rear body mountings may be held by an auxiliary apparatus 9. The alternative technique of lifting the base vehicle 1 may be realised passively by a floor-based platform lift, or actively by actuators 63 arranged at the rear axle 15 of base vehicle 1.

Once the variable rear body mounting 2 has been pivoted completely downwards relative to base vehicle 1, the variable rear body mounting 2 is locked in the releasable main coupler 3 arranged at the bottom structure 11 of base vehicle 1. This locking condition may be achieved with the help of a mating coupler 31 firmly attached to the variable rear body mounting 2; when the variable rear body mounting 2 is lowered, the mating coupler 31 enters a clamping main coupler 3 adapted to be opened and locked.

When the variable rear body mounting 2 is lowered, the clamping main coupler 3 is open, and it is locked preferably automatically as soon as the variable rear body mounting 2 has reached its final position relative to base vehicle 1. Locking of the main coupler 3 is preferably controlled by two sensors 64 arranged to sense the final position of the variable rear body mounting 2 relative to base vehicle 1. When the rear body mounting 2 reaches its final position, the sensors 64 activate an actuator 65 associated with the displaceable part of main coupler 3 to cause said displaceable part to pass into its locking position, in which the mating coupler 31 of the variable rear body mounting 2 is clamped in the main coupler 3 arranged on the bottom structure 11 of base vehicle 1.

The main coupler 3 is preferably opened in response to an external signal, whereupon the variable rear body mounting 2 can be lifted relative to base vehicle 1.

In variations of the variable rear body mounting 2 that are intended to form a closed unit with the base vehicle 1 after installation thereon, the upper edges of the lateral side walls 17 of body 16 of base vehicle 1 require sealings 26 in the area of the shoulders 23 of the variable rear body mounting 2. In a preferred embodiment of the invention, when the variable rear body mounting 2 is lowered relative to base vehicle 1 and fixed in the aligning coupler 4 of base vehicle 1 by locking device 42, the sealing 26 is compressed between the shoulder 23 of the variable rear body mounting 2 and the upper edge of vehicle body 16, said edge and shoulder 23 being parallel to each other when the variable rear body mounting 2 has been lowered to its final position.

Figure 4:
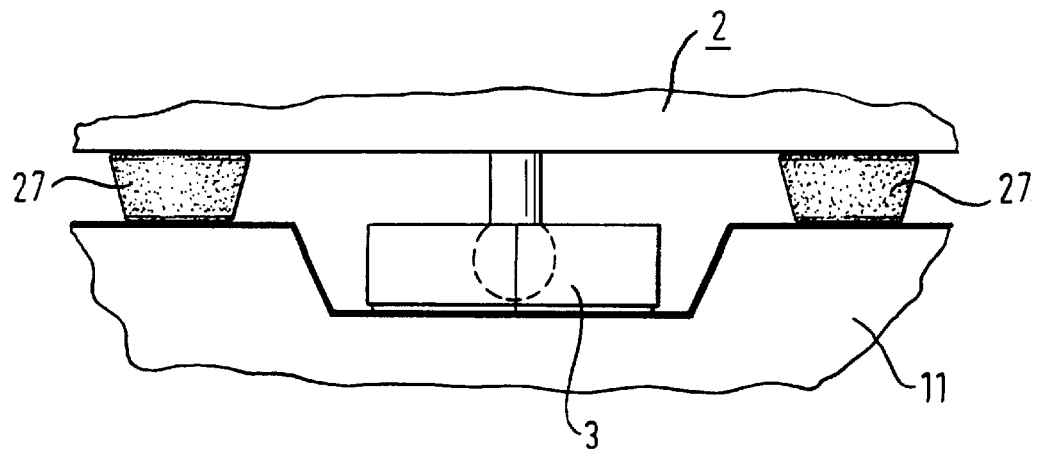

FIG. 4 illustrates a possible way of providing additional support to heavy variable rear body mountings 2, supplementing the releasable main coupler 3. The arrangement shown provides passive support members in the form of blocks 27 arranged on rear body mounting 2 and having limited resilience or slight elasticity to bias the variable rear body mounting 2, through main coupler 3, with respect to the bottom structure 11 in order to reduce rolling motions of heavy rear body mountings 2.

FIG. 5 shows an embodiment of a powered road vehicle according to the invention comprising a base vehicle 1 and a substitutable, box-like rear body mounting 2. The rear part of body 16 of base vehicle 1 includes side and rear walls 17, 18. The lateral side walls 17 may join the front part of vehicle body 16, which includes the cabin, through transition portions 17A. The rear body mounting 2 comprises a bottom part 21 to be fitted between the side and rear walls 17, 18 and the transition portions 17A, and shoulders 23 that are slightly seated on the free edge faces of the lateral side walls 17 of base vehicle 1, or separated from said edge faces by a narrow gap, when the rear body mounting 2 has been placed on base vehicle 1 and when the mating coupler 31 (mushroom-shaped in the embodiment shown) arranged on the bottom face 22 of rear body mounting 2 has been locked in the main coupler (not shown in FIG. 5) provided above rear axle 15.

A protruding mating member 24 is firmly fixed to the upper end of front wall 28 of the rear body mounting 2 having the shape of a box or container, said mating member 24 being designed for aligning cooperation with the aligning coupler (not shown in FIG. 5) arranged in the upper part of body 16 of base vehicle 1. To place rear body mounting 2 on the bottom structure (not shown in FIG. 5) of base vehicle 1, an auxiliary apparatus 9 in the form of a portal frame or manipulator may be used.

FIGS. 6 and 6A show a powered road vehicle according to the invention comprising a base vehicle 1 and a box-shaped rear body mounting 2. The base vehicle comprises a front axle 14, a rear axle 15 and a vehicle body 16, the front part of vehicle body 16 including a driver's cab and the rear part of vehicle body 16 having lateral side walls 17 and a rear wall 18. The rear wall 18 is arranged in the form of a rear door having two door leaves 19 that are curved around the rear corners of base vehicle 1 to join the lateral side walls 17. The rear body mounting 2 has a bottom part 21 to be fitted between the side and rear walls 17, 18, and shoulders 23 conforming to the upper edge faces of the side and rear walls 17, 18.

FIGS. 6 and 6A further show an aligning coupler 4 arranged in the rear wall of the driver's cab formed by vehicle body 16. In this embodiment, the aligning coupler 4 comprises an alignment portion 41 which is open towards the top and rear sides and is shaped as an alignment mouth tapering towards the front at both lateral sides such as to define a hollow wedge. When the rear body mounting 2 is lifted and moved forwardly from the rear side, a mating member 24 complementary to the alignment mouth and secured to the front wall of rear body mounting 2 can be inserted in the alignment portion 41, thus aligning the rear body mounting 2 horizontally. Further, the aligning coupler 4 is provided at its centre with a vertical guide member 43 in the form of a guide pin protruding vertically upwardly and having a conically tapering free end. The guide pin cooperates with the mating member 24 of rear body mounting 2 such that the rear body mounting 2 can be lowered while being guided in a linear, or translational, manner until the rear body mounting 2 is seated on the main coupler (not shown here).

An aligning coupler 4B of the aforementioned type, e.g. including a pin-shaped guide member 43', may be arranged additionally or alternatively at the rear end of base vehicle 1. It is also possible to provide two or more aligning couplers 4, 4B of this type arranged side by side at a distance from each other such as to cooperate with a corresponding plurality of mating couplers formed on the rear body mounting 2.

Figure 7:
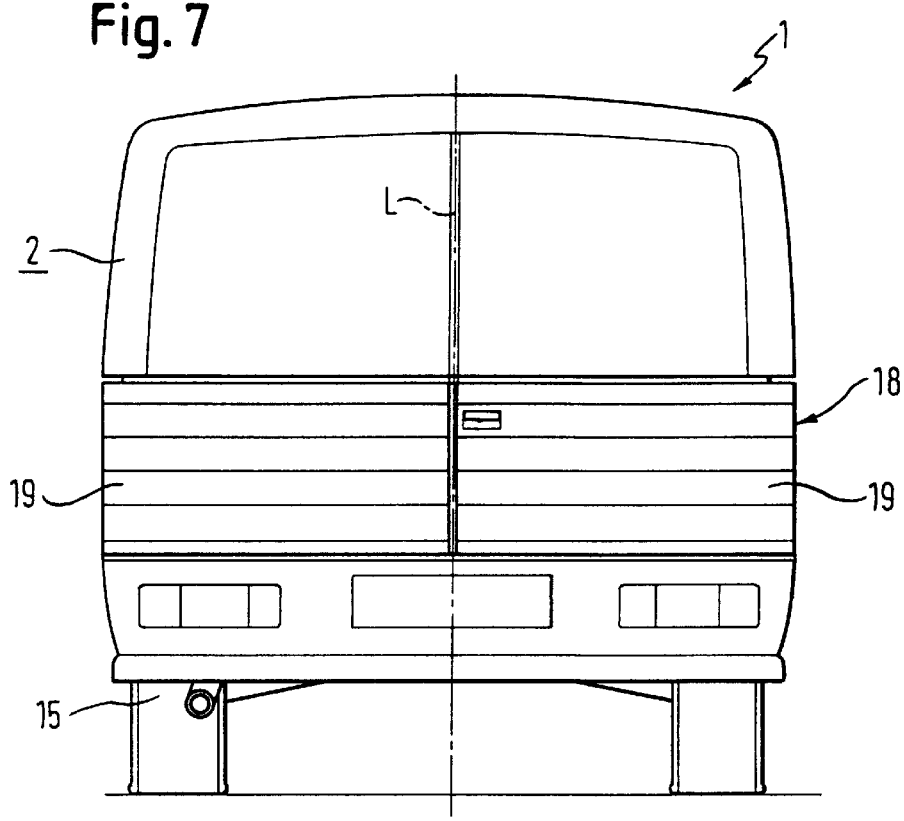
Figure 7:
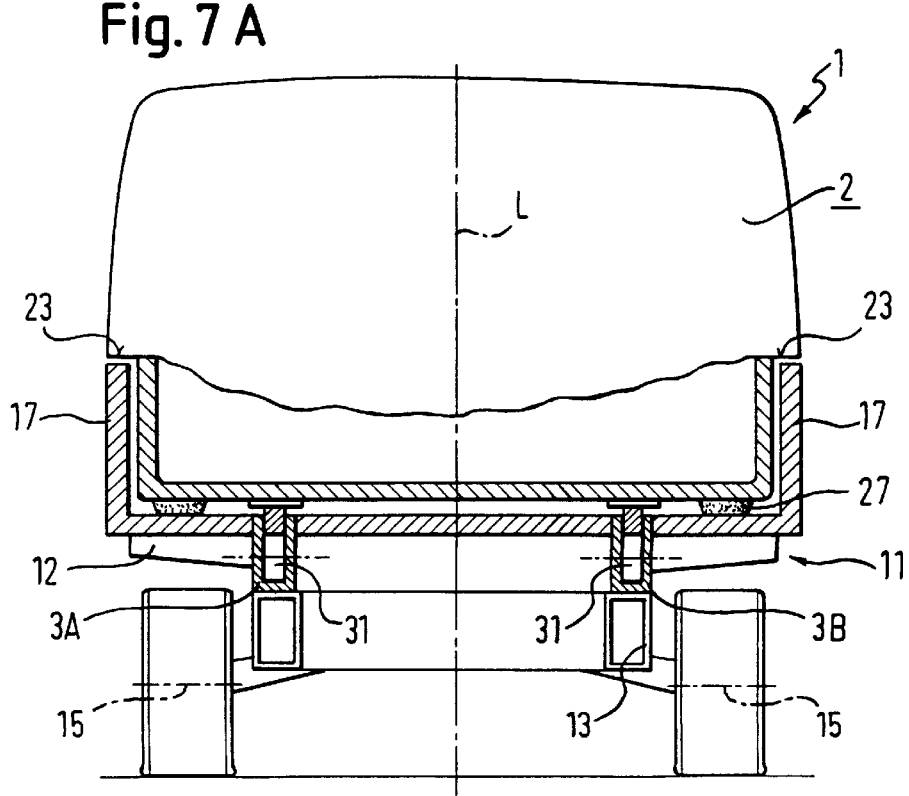

FIGS. 7 and 7A depict rear views of a powered road vehicle according to the invention. In this embodiment, the load-transferring bottom structure 11 comprises a vehicle body bottom 12 in the form of bottom plate, and a carriage 13 on which the main coupler is arranged in the form of main coupler sub-units 3A, 3B such that the resulting main coupler force is transferred to rear axle 15 along the longitudinal axis L of base vehicle 1. The mating couplers 31 of the box-like rear body mounting 2 are releasably locked in the main coupler sub-units 3A, 3B, and the rear body mounting 2 is additionally supported on the bottom plate of the vehicle body bottom 12 by support blocks 27.

The rear body mounting 2 further comprises shoulders 23 extending across the lateral side walls 17 at a slight distance. As illustrated schematically in FIG. 6, the rear wall 18 is arranged as a door having two leaves 19 which are curved around the rear corners of base vehicle 1 to join the lateral side walls 17, where the door leaves 19 are hinged on the lateral side walls 17 or on a separate support (not shown). Owing to this construction, the entire width of base vehicle 1 between the lateral side walls is available when inserting the rear body mounting 2 from the rear end of the vehicle.

Figure 8:
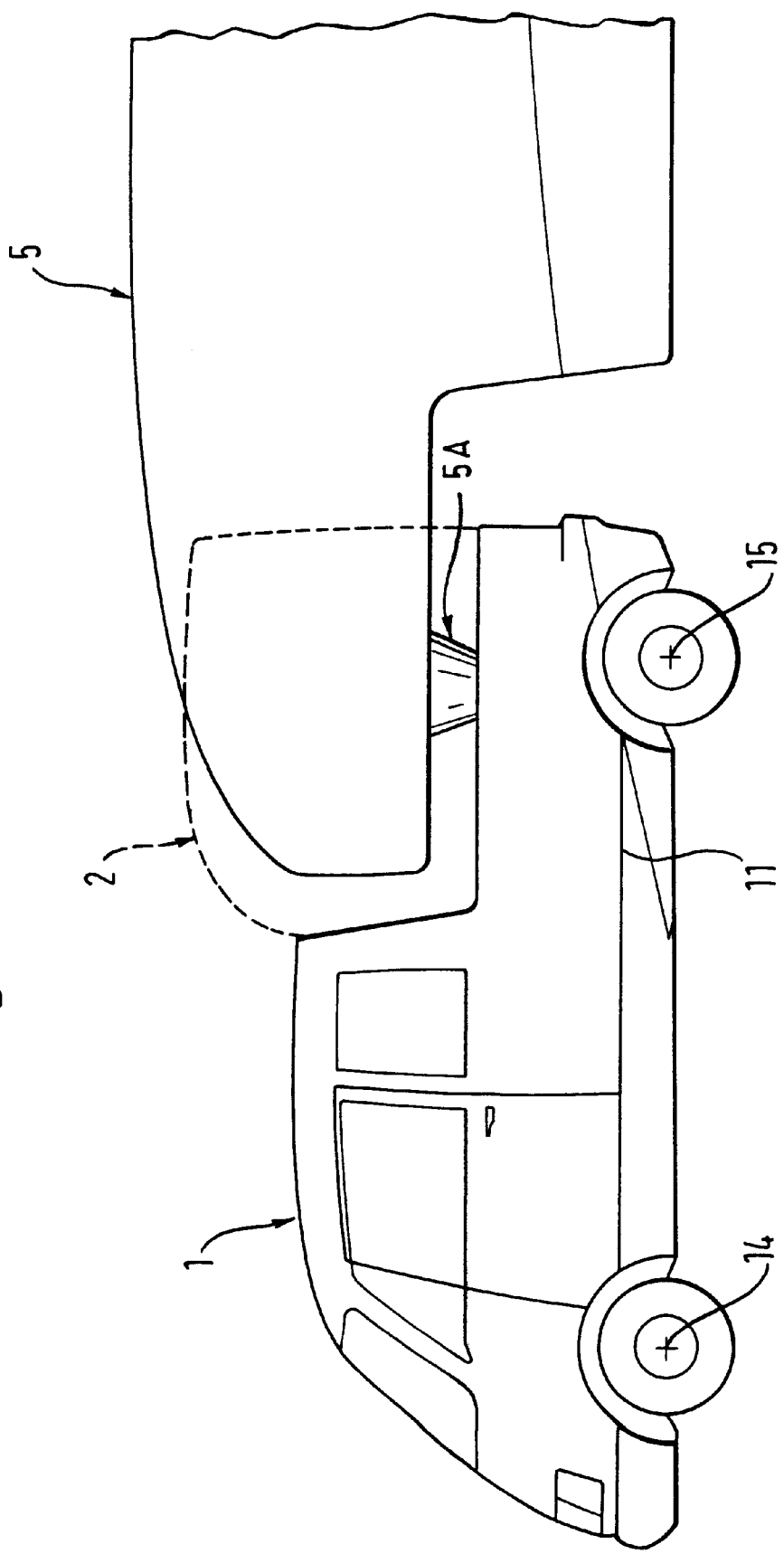
Figure 9:
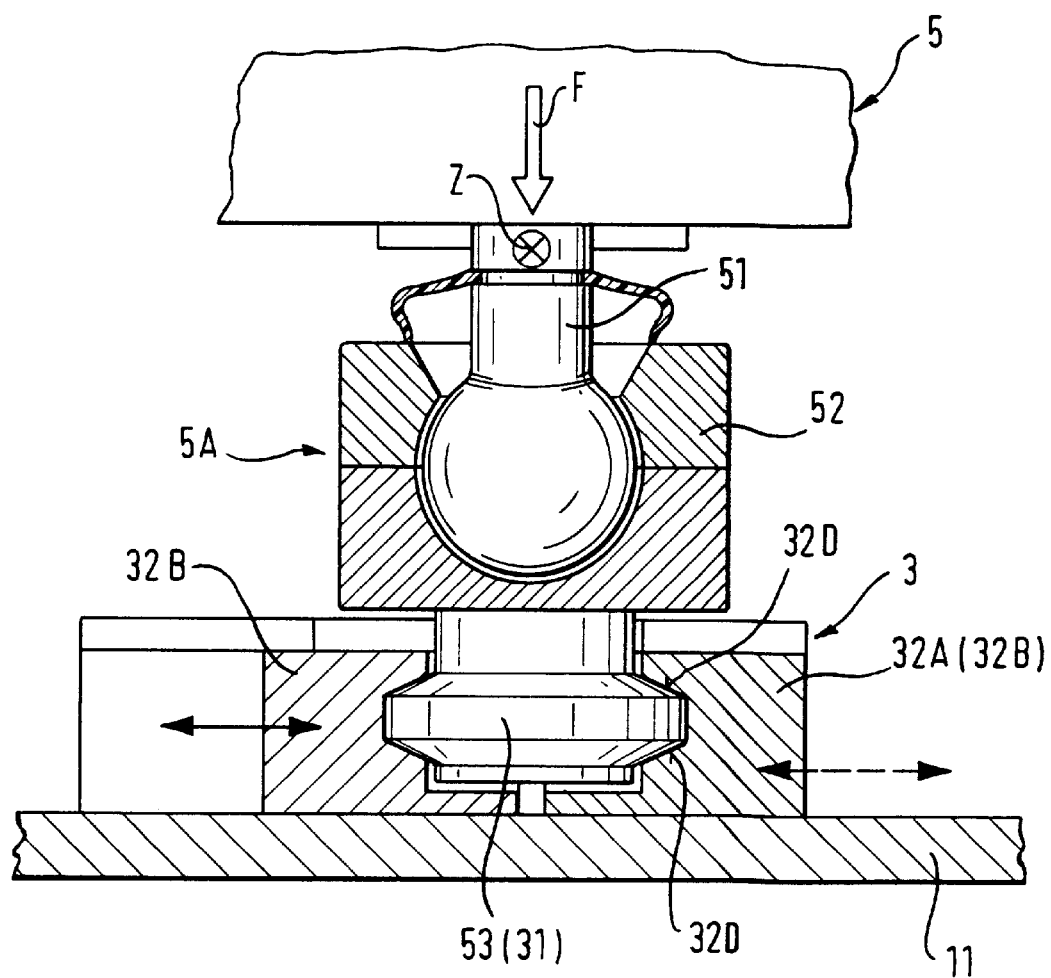

FIG. 8 shows a powered road vehicle according to the invention including a semi-trailer 5 coupled to the main coupler (not shown) of base vehicle 1. A replaceable rear body mounting 2 may be locked in the main coupler instead of the semi-trailer 5. Such a replaceable rear body mounting 2 is represented in dashed lines and may have the shape of a vertically extending container. Thus, the main coupler according to the invention (not shown in FIG. 8) is designed such that, on the one hand, an adapted replaceable rear body mounting 2 can be locked to the load-transferring bottom structure 11 and, hence, to the suspended front and rear axles 14, 15 of base vehicle 1, and on the other hand, a semi-trailer 5 can be coupled to the bottom structure 11 such as to transfer vertical loads and horizontal pulling or trailing forces. The coupler joint (not shown) of the semi-trailer 5 forms part of the semi-trailer coupler SA. FIG. 9 schematically shows an example of such a semi-trailer coupler.

FIG. 9 schematically illustrates a main coupler 3 according to the invention comprising a clamping jaw 32A secured to the bottom structure 11 of the base vehicle (not shown), and a clamping jaw 32B which is displaceable through an actuator, e.g. a hydraulic actuator, in the directions indicated by the double arrow. The semi-trailer coupler 5A of the semi-trailer 5 is associated with a ball pin 51 fixed to the semi-trailer 5, the ball of pin 51 being engaged in a ball socket 52 such as to be movable to all sides in a sliding manner, the ball socket 52 being locked between the clamping jaws 32A, 32B of the main coupler 3 through a mushroom-shaped coupling rod 53. Hence, both the vertical trailer load F and the horizontal pulling forces Z exerted by the semi-trailer 5 are transferred to the bottom structure 11 of the base vehicle through the ball pin 51, the ball socket 52, the mushroom-shaped coupling rod 53, and the main coupler 3.

The bottom faces of rear body mountings according to the invention (not shown) are each provided with a mating coupler 31 corresponding to the mushroom-shaped coupling rod 53 to releasably lock the respective rear body mounting between the clamping jaws 32A, 32B of the main coupler 3. The mating coupler 31 is discus-shaped and comprises upper and lower annular conical clamping surfaces 32D engaged by the complementary clamping mouths of the clamping jaws 32A, 32B.

As indicated by the double arrow depicted in dashed lines, the clamping jaw shown on the right-hand side in FIG. 9 may likewise be displaceable in two directions by an actuator. Further, as represented by the trailing force component Z, the clamping jaws 32 opposing each other diametrically across the mating coupler 31 (53) may face each other in a direction transverse to the driving direction of the vehicle. This arrangement is favourable particularly when the mating coupler 31 of a rear body mounting (not shown here) is pivotable downwardly from the pre-alignment position to the final position against the driving direction so that the mating coupler 31 can pivoted between the opened clamping jaws 32 perpendicularly to the plane of the drawing figure. This shortens the opening path of the clamping jaws 32B as compared to a situation where the mating coupler 31 is pivoted between the jaws along a trajectory comprised in the drawing plane of FIG. 9.

Figure 10:
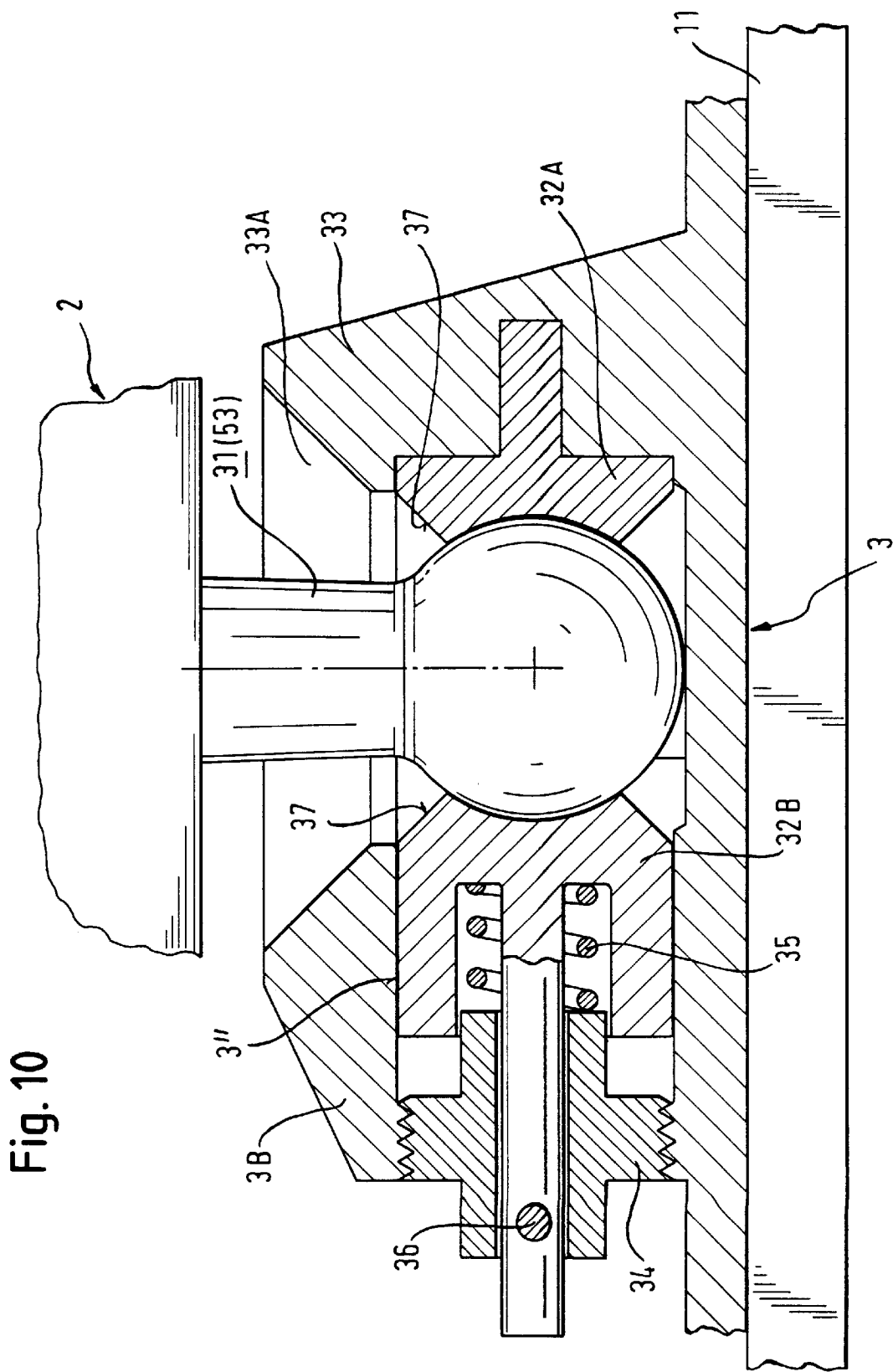

FIG. 10 schematically shows an embodiment of the main coupler 3 when the latter is designed as a ball-clamping coupler. The main coupler 3 comprises a coupler block 33 fixed to the load-transferring bottom structure 11 of the base vehicle such as to transfer forces. A fixed clamping jaw 32A and a displaceable clamping jaw 32B, which may be displaceable hydraulically, are arranged in the coupler block 33, both clamping jaws being formed as ball sockets. The mating coupler 31 attached on the bottom face of rear body mounting 2 is designed as a ball pin, the spherical head of which is clamped between the clamping jaws 32A, 32B to prevent linear and rotational movement of the ball pin. The upper part of coupler block 33 is provided with a centering guide portion 33A in the form of a hollow centering cone to guide the mating coupler 31 of the rear body mounting 2 between the clamping jaws 32A, 32B when the coupler 31 of the rear body mounting is lowered into the main coupler 3.

The displaceable clamping jaw 32B is guided displaceably in a guide block 34, which in turn is secured to coupler block 33 such as to be displaceable longitudinally. In addition, the displaceable clamping jaw 32B is supported by guide block 34 through a biasing spring 35 extending in the direction of displacement. This arrangement allows the mating coupler 31 to be snapped into the main coupler 3 in a resilient manner; to this end, the displaceable clamping jaw 32B—just like the fixed clamping jaw 32A—also has an oblique guiding surface 37 to guide the spherical head of the mating coupler 31 between the clamping jaws 32A, 32B; in so doing, the mobile clamping jaw 32B is first pushed away and then urged back by spring 35 once the spherical head of the coupler 31 has snapped into the ball sockets formed by the clamping jaws. A locking member 36, represented by a bolt in FIG. 10, may be set manually and/or by an actuator to lock the mobile clamping jaw 32B in its clamping position.

In this embodiment of the main coupler, the trailer coupler of the semi-trailer (not shown) likewise comprises a spherical coupling rod, instead of the mushroom-shaped coupling rod 53 in FIG. 9.

Figure 11:
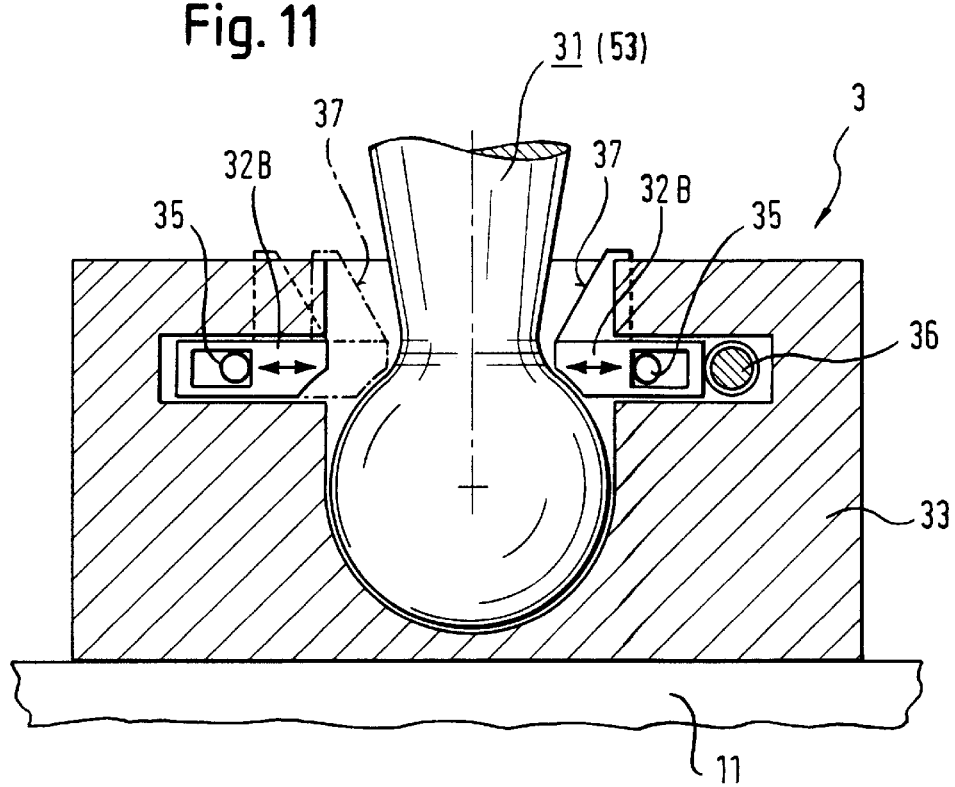
Figure 11:
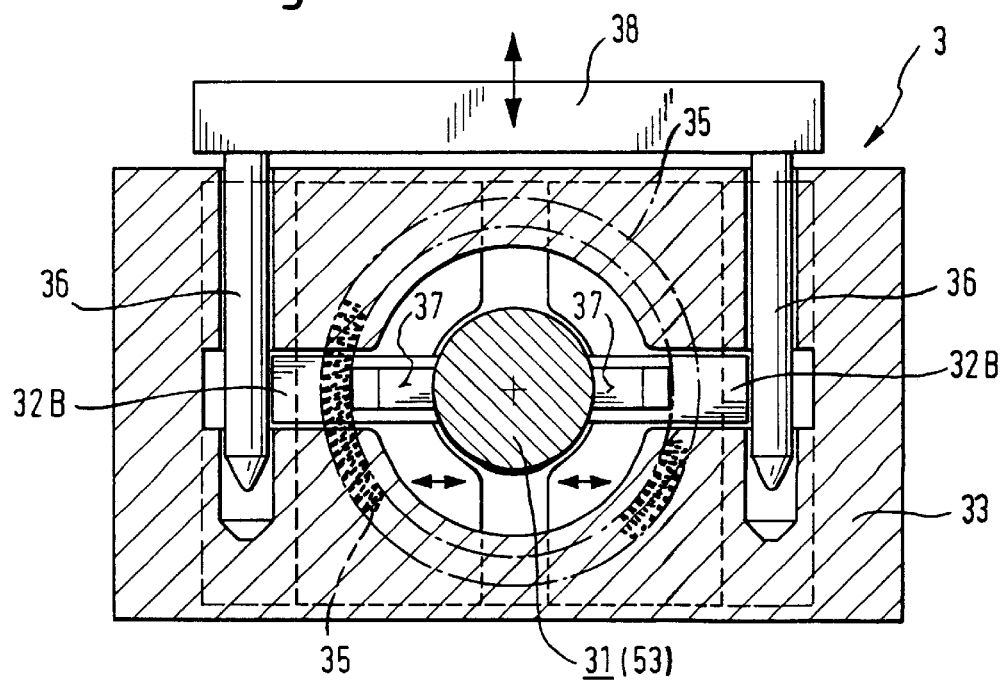

In the embodiment shown schematically in FIGS. 11 and 11A, the rear body mounting (not shown) is also locked in main coupler 3 through a ball pin serving as the mating coupler 31. The coupler block 33 secured to the bottom structure 11 is shaped as a semi-spherical socket; two displaceable arcuate clamping jaws 32B opposing each other protrude into the hollow cylindrical insertion section of the semi-spherical socket such as to engage and clamp the neck portion of the spherical head of mating coupler 31. This causes the mating coupler 31 to be drawn downwardly into coupler block 33 and clamped horizontally on all sides.

The displaceable clamping jaws 32B are supported by biasing springs 35 arranged within coupler block 33; in the present embodiment, these springs are provided in the form of annular springs or hairpin springs or leaf springs. The clamping parts of the jaws 32B protruding into the hollow cylindrical insertion section of the semi-spherical socket of coupler block 33 are provided with oblique centering and guiding surfaces 37 engaged by the spherical head of mating coupler 31 when the latter is lowered into the main coupler such that the clamping jaws 32B are urged away from each other against the resilient force of the biasing springs 35, and the spherical head is caught between the clamping jaws.

Moreover, the clamping jaws 32B may be locked in the clamping position with the help of locking members 36, e.g. transversely extending bolts, guided displaceably in associated guide bores within coupler block 33 and supported on a locking bridge 38, which is adjustable manually and/or by an actuator in the directions indicated by the double arrow.

Figure 12:
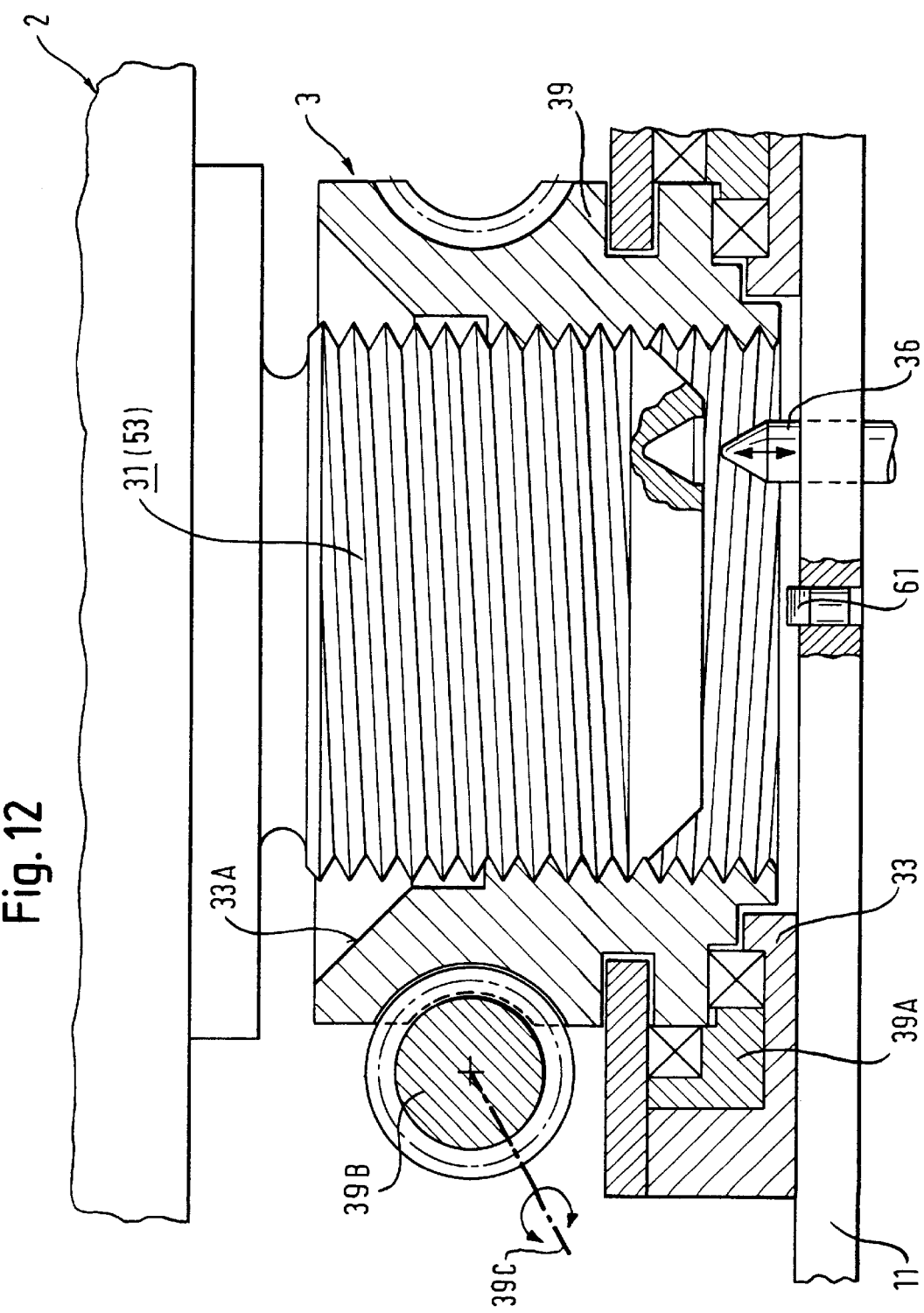

According to FIG. 12, the main coupler 3 is arranged in the form of a screw coupler, in which a mating coupler 31 fixed to the bottom of rear body mounting 2 is formed as a screw pin that is drawn into a rotatable threaded tube 39. The threaded tube 39 is supported rotatably on bearings 39A provided in the coupler block 33 of main coupler 3 which in turn is secured to the bottom structure 11 of the base vehicle. The free end of threaded tube 39 provides a hollow conical centering guide portion 33A adapted to centre and guide a complementary cone formed on the free end of mating coupler 31 of rear body mounting 2 into the threaded tube 39.

The outer circumference of the threaded tube 39 may be formed as a worm pinion engaged by a drive worm 39B that may be driven manually and/or by a motor drive 39C. A displaceable locking bolt 36 is supported in an eccentric position at the bottom of the threaded bore of tube 39 and can be inserted in a locking bore provided in the mating coupler 31 to lock the mating coupler in the coupled state thereof. To avoid the mating coupler 31 penetrating too deeply into main coupler 3, the motor drive 39C may be switched off in the event of an overload; in addition, a position sensor 61 may be provided to stop the motor drive 39C.

Figure 13:
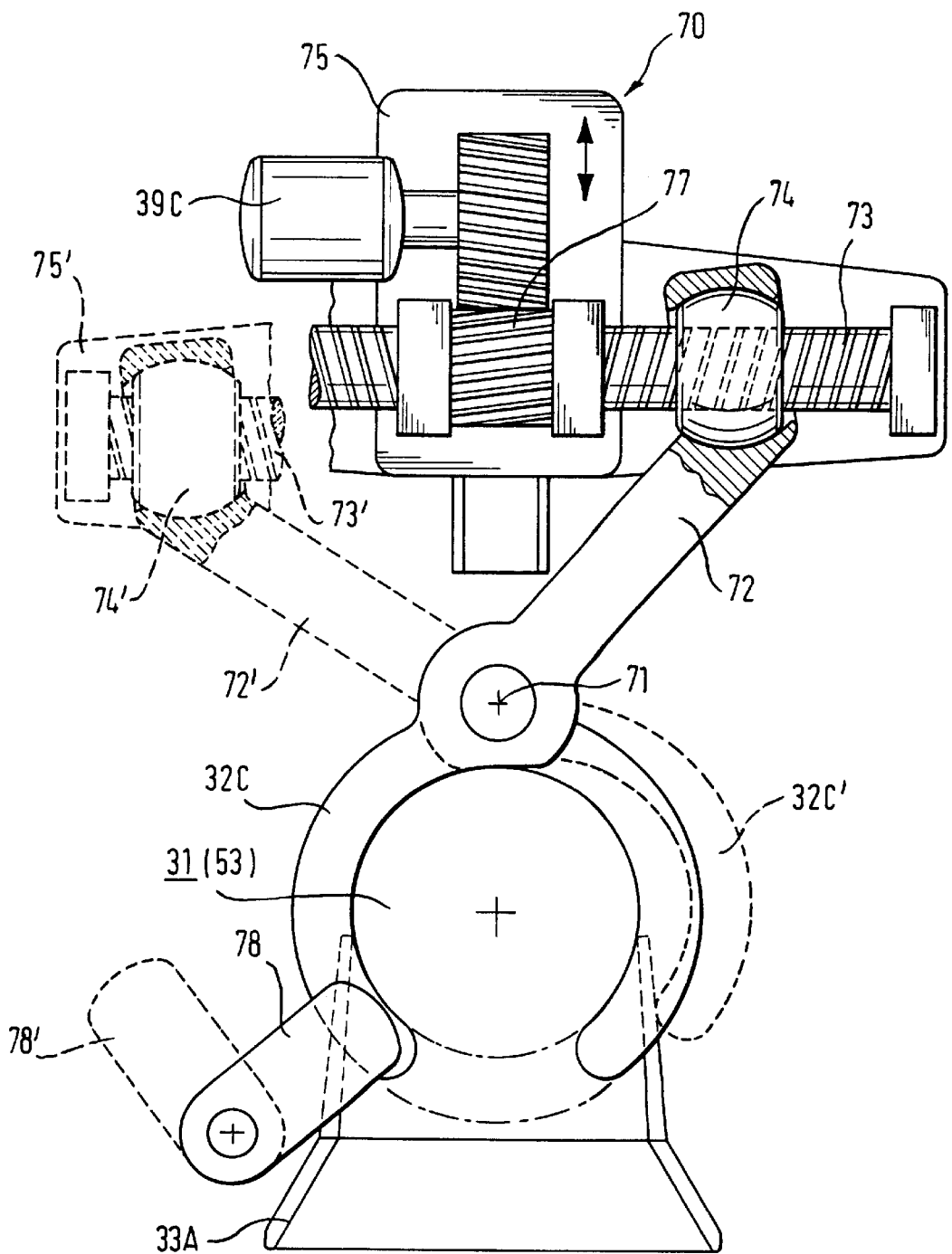

The main coupler shown in FIG. 13 is designed in the form of a scissor-type clamping mechanism comprising claw-like clamping members 32C which cooperate in a clamping manner with a mating coupler 31 or 53 (cylindrical in the embodiment shown) of the rear body mounting (not shown) or the semi-trailer coupler (not shown), respectively. The mating coupler 31 or 53 may comprise a groove (not shown) engaged by the clamping claws 32C in a clamping manner, and the clamping claws 32C may additionally exert a vertical downward force component. It is also possible to design the mating coupler 31 or 53 in the form of a mushroom pin or ball pin, and to adapt the shape of the clamping claws 32C to the shape of such a pin.

The clamping claws 32C comprise actuating arms 72 and are pivotable therewith about a stationary central pivot pin 71. A drive gear 70 engages the actuating arms 72 to close or open the claws 32C to clamp or release the mating coupler 31. Instead of the mechanical drive gear 70 illustrated in the exemplary embodiment, a hydraulic or pneumatic drive arrangement may be provided in which hydraulic or pneumatic cylinders directly engage the actuating arms 72.

In the embodiment shown, drive means 39C rotate a central drive pinion 77 to operate two driven elements 73 which are embodied by lead screws having opposite threads. The driven elements 73 engage the free ends of the actuating arms 72; in the embodiment shown, ball nuts 74 are mounted on the driven elements 73 to be displaceable in opposite directions, the ball nuts 74 engaging ball cups of the actuating arms 72.

As any movement of the actuating arms 72 necessarily results in a displacement of the driven elements 73, the whole drive gear 70 is mounted on a slide 75 displaceable in longitudinal guides. The displaced positions of various components are depicted in dashed lines in FIG. 13 and denoted by reference numerals including an apostrophe.

If a hydraulic or pneumatic drive is used, the actuating arms 72 or claws 32C in addition have to be locked mechanically (not shown) in the clamped position to ensure safety in the event of a fluid pressure drop.

Auxiliary supports 78 may be provided for the claws 32C to give the claws 32C further support in the clamped position. Such auxiliary supports 78 may be designed such as to simultaneously fulfil the function of an additional mechanical lock of the claws 32C in their clamped position when a hydraulic or pneumatic drive is utilised.

A centering guide portion 33A may be arranged in front of the clamping claws 32C to guide the mating coupler 31 into the clamping claws 32C when the rear body mounting is pivoted downwards.

FIG. 14 schematically shows an embodiment of a main coupler comprising a plurality of main coupler sub-units 3A, 3B supported at a distance from each other on a carriage 13 constituting the load-transferring bottom structure of the base vehicle, said main coupler sub-units 3A, 3B being arranged to transfer vertical loads and horizontal trailing forces. In the embodiment shown, the sub-units 3A, 3B (only one sub-unit being represented in FIG. 14) comprise funnel-shaped coupler sockets 30 engaged by conical mating couplers 31A fixed to the bottom of rear body mounting 2. Each mating coupler 31A further comprises a locking pin 31B that vertically downwardly engages an associated bore in the respective sub-unit; the locking pin 31B is engaged by a clamping wedge 32E supported on carriage 13 and displaceable by an actuator.

By means of the clamping wedges 32E, the mating couplers 31A of rear body mounting 2 are pulled down towards the carriage 13 and locked thereto. The coupler sockets 30 are coated with wear layers 30A; the tightening forces transferred from the clamping wedges 32E to the mating couplers 31A are transferred to the coupler sockets 30 through the wear layers 30A.

It will be appreciated that various additions and modifications may be made to the embodiments shown and described.

In the embodiments according to FIGS. 10 and 11, for example, the displaceable clamping jaw may be designed to be releasable manually or by an actuator against the force of the biasing spring 35 when the mating coupler is to be uncoupled.

Further, in the event that a mere clamping lock is not sufficient to prevent the rear body mounting from rotating, additional locking projections or the like may be provided to positively prevent any rotation.

Moreover, the mating coupler arranged on the bottom of the rear body mounting may be designed to be lowered or pivoted downwards manually or by an actuator; in this arrangement, it may be possible first to lower the rear body mounting to its final position and then to lower the mating coupler into the main coupler to lock the mating coupler in the main coupler.

In contrast to the embodiments shown, it is also possible in principle to provide the main coupler mechanism at the bottom of the rear body mounting, and the mating coupler on the bottom structure, even though such an arrangement may be more complicated and/or costly.

The side walls provided on the rear part of the powered road vehicle according to the invention may be arranged to be detachable or pivotable downwards.

What is claimed is:

1. A powered road vehicle of the type of a passenger car having a permissible maximum laden weight of 3.5 tons or of a lorry having a permissible maximum laden weight of 5 tons, comprising:

a base vehicle having a load-transferring bottom structure which includes a vehicle body bottom and/or a carriage, said bottom structure being provided with a front axle and at least one rear axle, the base vehicle further including a vehicle body supported on the bottom structure, the rear part of the vehicle body having side walls, a replaceable rear body mounting upwardly joining the side walls, the rear body mounting being supported directly on the bottom structure in a load-transferring manner, the base vehicle further comprising a main coupler directly mounted and arranged at the bottom structure in a load-transferring manner, and an aligning coupler separately arranged at a distance from the main coupler, the rear body mounting further comprising a mating coupler mating with the main coupler of the base vehicle and a mating member mating with the separate aligning coupler of the base vehicle, said rear body mounting, in a locking position, being releasably locked in the main coupler of the base vehicle by mating engagement of the mating coupler and the main coupler, said mating member of said rear body mounting being adapted to engage with the aligning coupler in a pre-alignment position, and to be lowered from the pre-alignment position into the locking position at which the main coupler is locked to the mating coupler, said main coupler being arranged and designed both to provide positive engagement of the rear body mounting such as to prevent displacement and rotation thereof, and to enable coupling of a semi-trailer with the bottom structure such that vertical loads and trailing forces resulting from the coupling with the semi-trailer are transferred by the main coupler to the bottom structure.

2. The powered road vehicle according to claim 1, wherein at least one additional rear body mounting substitutable for said rear body mounting is provided and arranged to be supported directly on the bottom structure in a load-transferring manner, the additional rear body mounting having a mating coupler and a mating member which are, respectively, releasably lockable to the main coupler and attachable to the aligning coupler.

3. The powered road vehicle according to claim 2, wherein the main coupler comprises a central main coupler unit arranged in the longitudinal axis of the base vehicle in the area of the rear axle.

4. The powered road vehicle according to claim 2, wherein each of the rear body mountings have a bottom part which fits between the side walls, the bottom part having a bottom wall adapted to lock the rear body mounting to the main coupler.

5. The powered road vehicle according to claim 4, wherein the main coupler comprises a central main coupler unit arranged in the longitudinal axis of the base vehicle in the area of the rear axle.

6. The powered road vehicle according to claim 4, wherein at least one of the rear body mountings is provided with shoulders adapted to be seated on the side walls.

7. The powered road vehicle according to claim 6, wherein the main coupler comprises a central main coupler unit arranged in the longitudinal axis of the base vehicle in the area of the rear axle.

8. The powered road vehicle according to claim 1, wherein the side wall of the vehicle includes a rear side wall and lateral side walls, said rear side wall of the base vehicle being arranged in the form of a pivotable door having two door leaves pivotable about hinges disposed in the area of the lateral side walls at a distance from rear ends of the lateral side walls.

9. The powered road vehicle according to claim 8, wherein the main coupler comprises a central main coupler unit arranged in the longitudinal axis of the base vehicle in the area of the rear axle.

10. The powered road vehicle according to claim 1, wherein the aligning coupler is arranged in the form of a plurality of aligning coupler sub-units disposed at a distance from each other on the vehicle body of the base vehicle and/or on the bottom structure thereof.

11. The powered road vehicle according to claim 10, wherein the main coupler comprises a central main coupler unit arranged in the longitudinal axis of the base vehicle in the area of the rear axle.

12. The powered road vehicle according to claim 10, wherein the aligning coupler comprises at least one horizontally extending alignment element arranged at a distance above the main coupler, the mating member of the rear body mounting being adapted to be inserted horizontally in the alignment element, the aligning coupler further comprising a locking device including a horizontally displaceable bolt adapted to releasably lock the rear body mounting in the pre-alignment position such that the rear body mounting can be pivoted downwards into locking engagement in the main coupler.

13. The powered road vehicle according to claim 12, wherein the main coupler comprises a central main coupler unit arranged in the longitudinal axis of the base vehicle in the area of the rear axle.

14. The powered road vehicle according to claim 10, wherein the aligning coupler comprises a horizontal or vertical alignment element into which a mating member of the rear body mounting can be introduced horizontally or vertically, respectively, and vertical guiding means along which the rear body mounting can be lowered in a linear vertical movement.

15. The powered road vehicle according to claim 14, wherein the main coupler comprises a central main coupler unit arranged in the longitudinal axis of the base vehicle in the area of the rear axle.

16. The powered road vehicle according to claim 1, wherein the main coupler is arranged in the form of a plurality of main coupler sub-units disposed at a distance from each other such that the resulting main coupler force is transferred to the bottom structure in the longitudinal axis of the base vehicle in the area of the rear axle.

17. The powered road vehicle according to claim 16, wherein the main coupler comprises a central main coupler unit arranged in the longitudinal axis of the base vehicle in the area of the rear axle.

18. The powered road vehicle according to claim 1, wherein any vertical supporting of the rear body mounting on the vehicle body of the base vehicle is exclusively realized by resilient means.

19. The powered road vehicle according to claim 1, wherein the main coupler comprises a centering guide portion which centers and guides the mating coupler of the rear body mounting when the rear body mounting is lowered to lock the mating coupler in the main coupler, and the aligning coupler and/or its associated support means are arranged to have limited compressibility.

20. The powered road vehicle according to claim 1, wherein the main coupler comprises a central main coupler unit arranged in the longitudinal axis of the base vehicle in the area of the rear axle.

21. The powered road vehicle according to claim 20, wherein the central main coupler comprises displaceable clamping means adapted to lock the rear body mounting to the bottom structure such that the rear body mounting is tightened vertically to the bottom structure and prevented from displacement and rotation, the rear body mounting being supported on the bottom structure by additional support means.

22. The powered road vehicle according to claim 20, wherein the central main coupler is arranged in the form of a resilient snap-in coupler having at least one resiliently yielding clamping means adapted to cooperate in a clamping manner with a mating coupler fixed to the bottom of the rear body mounting, the clamping means being further lockable by a locking means.

23. The powered road vehicle according to claim 20, wherein the central main coupler is provided with a drive means.

24. The powered road vehicle according to claim 23, wherein the central main coupler and the mating coupler locked therein comprise cooperating conical clamping surfaces.

25. The powered road vehicle according to claim 23, wherein the central main coupler comprises clamping elements opposing each other diametrically of the main coupler, each clamping element being displaceable by an actuator.

26. The powered road vehicle according to claim 25, wherein the displaceable clamping elements oppose each other transversely to the driving direction.

* * * * *